(12) United States Patent
Matsumoto

(10) Patent No.: US 6,371,779 B2
(45) Date of Patent: Apr. 16, 2002

(54) ROTARY CONNECTOR

(75) Inventor: Tsuyoshi Matsumoto, Tokyo (JP)

(73) Assignee: Niles Parts Co., Tokyo (JP)

( * ) Notice: Subject to any disclaimer, the term of this patent is extended or adjusted under 35 U.S.C. 154(b) by 0 days.

(21) Appl. No.: 09/752,778

(22) Filed: Jan. 3, 2001

(30) Foreign Application Priority Data

Jan. 6, 2000 (JP) .................................... P2000-001097

(51) Int. Cl.$^7$ ................................................ H01R 3/00
(52) U.S. Cl. ...................................................... 439/164
(58) Field of Search ................................. 439/164, 15

(56) References Cited

U.S. PATENT DOCUMENTS 5,450,320 A * 9/1995 Tsubaki et al.
5,977,669 A * 11/1999 Yoshida et al. ............ 310/68 D

FOREIGN PATENT DOCUMENTS

JP  3-55955  8/1991

\* cited by examiner

*Primary Examiner*—Khiem Nguyen
*Assistant Examiner*—Javaid Nasri

(74) *Attorney, Agent, or Firm*—Rader, Fishman & Grauer

(57) ABSTRACT

A rotary connector is provided for an electric apparatus in a steering wheel that can carry a relatively large amount of current. The connector has a stator housing mounted on an automobile body, a rotor housing rotatable mounted to the stator housing and coupled to the steering wheel. An attachment having an annular flange couples the rotor housing to the stator housing so that the rotor housing is rotatable relative to the stator housing. A flat cable is accommodated in a space defined by the rotor housing and the stator housings. A slip-ring mechanism is provided between the flange and a bottom of the stator housing. The slip-ring has movable contact plates supported by the flange and a nonmovable contact plate on the stator housing. The contact plates are in sliding contact with each other providing current flow therebetween, thereby providing additional electrical contact between the steering wheel and the automobile body for an electrical apparatus that consumes a large amount of current. A cord that can carry relatively large current passes through the rotary connector, and is connected at one end to an electrical appliance in the steering wheel, for example a heater, and at the other end is soldered to a projecting portion of the movable contact plate. In this manner, the cord rotates together with the steering wheel, and the rotor housing without being twisted.

12 Claims, 2 Drawing Sheets

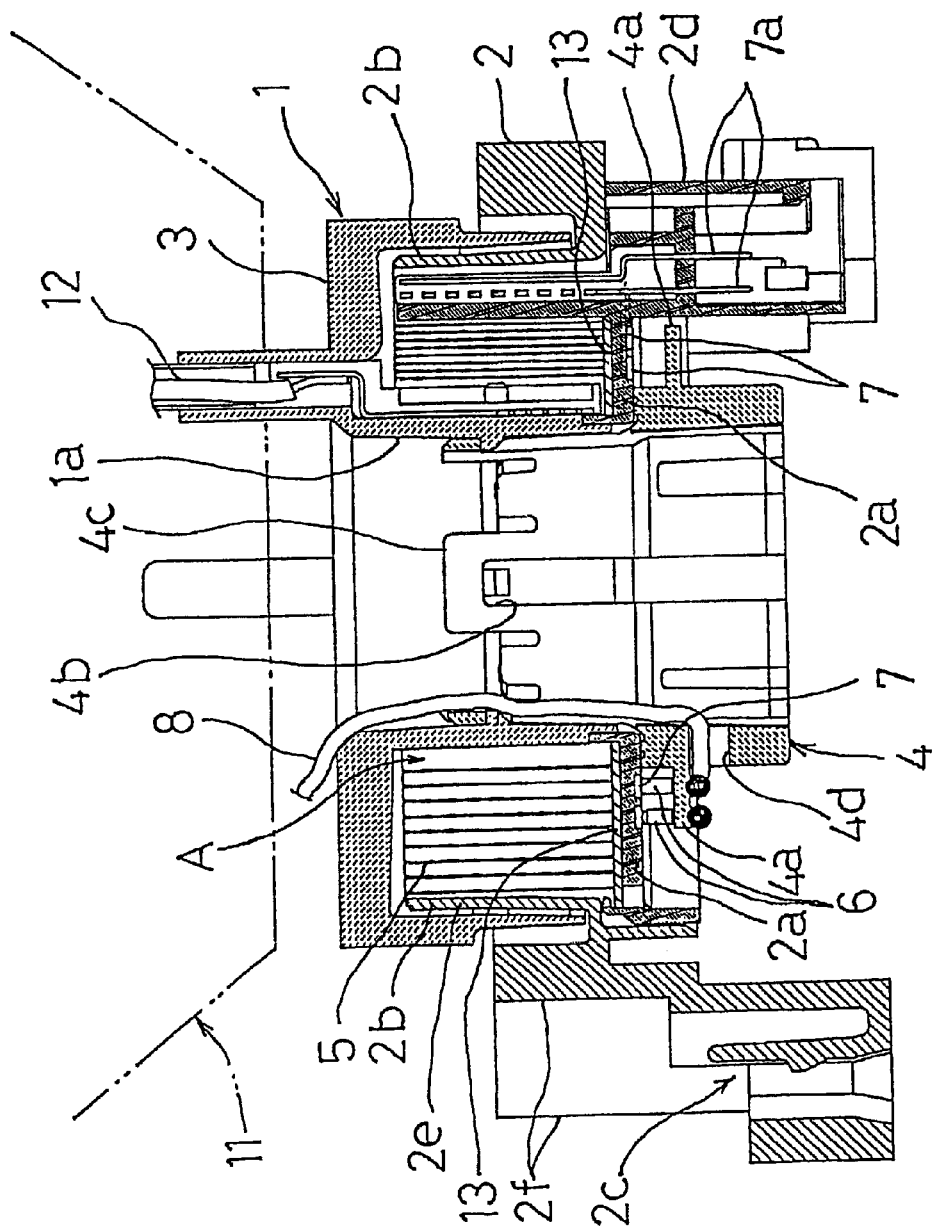

ROTARY CONNECTOR

BACKGROUND OF THE INVENTION

1. Field of the Invention

The present invention relates to a rotary connector that electrically connects between a steering wheel and a body of an automobile, and more particularly to a rotary connector that incorporates a slip-ring mechanism.

2. Description of the Related Art

A conventional rotary connector is disclosed, for example, in Japanese Patent No. 3-55955. This conventional connector includes a rotor housing and a stator housing assembled to each other into a complete housing assembly in which a flat cable in the shape of a spiral is housed and electrically connects the vehicle body and the steering wheel.

The conventional rotary connector is used for an air bag system or an alarm device mounted to the steering wheel. Thus, the current that flows through the connector is small. Accordingly, the flat cable includes thin wires covered with a thin film.

However, the aforementioned conventional rotary connector can be used only for low current applications. Thus, the conventional rotary connector cannot be applied to a heater that heats a steering wheel, because the heater requires a large current. If the heater current flows through a conventional flat cable, the conductors in the flat cable generate heat sufficient to melt the film covering the conductors.

SUMMARY OF THE INVENTION

An object of the present invention is to solve the problems associated with the aforementioned conventional rotary connector. More specifically, an object of the invention is to provide a rotary connector suitable for an electric apparatus that is assembled into a steering wheel and consumes a relatively large current.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention comprises a rotary connector having: a stator housing mounted on a vehicle body of an automobile; a rotor housing rotatably mounted to the stator housing and coupled to a steering wheel; an attachment that couples the rotor housing to the stator housing so that the rotor housing is rotatable relative to the stator housing; and a flat cable accommodated in a space defined by the rotor housing and the stator housing. The attachment has an annular flange formed at an outer periphery thereof, and a slip-ring mechanism provided between the flange and a bottom section of the stator housing.

According to another feature of the invention, the rotary connector has the flat cable and a cord, and the cord has one end thereof connected to a device mounted on the steering wheel and the other end thereof connected to the slip-ring mechanism through a shaft sleeve.

According to another feature of the invention, the flange of the attachment supports movable contact plates of the slip-ring mechanism thereon; and the bottom of the stator housing has a non-movable contact plate thereon on which the movable contact plate slides.

According to another feature of the invention, the movable contact plate is provided on the flange of the attachment and connected to the cord, and the non-movable contact plate is insert-molded in the bottom section of the stator housing.

BRIEF DESCRIPTION OF THE DRAWINGS

The present invention will become more clearly appreciated as the disclosure of the invention is made with reference to the accompanying drawings. In the drawings:

FIG. 2 is a cross-sectional view of the rotary connector shown in FIG. 1.

DETAILED DESCRIPTION OF THE INVENTION

Figure 1:
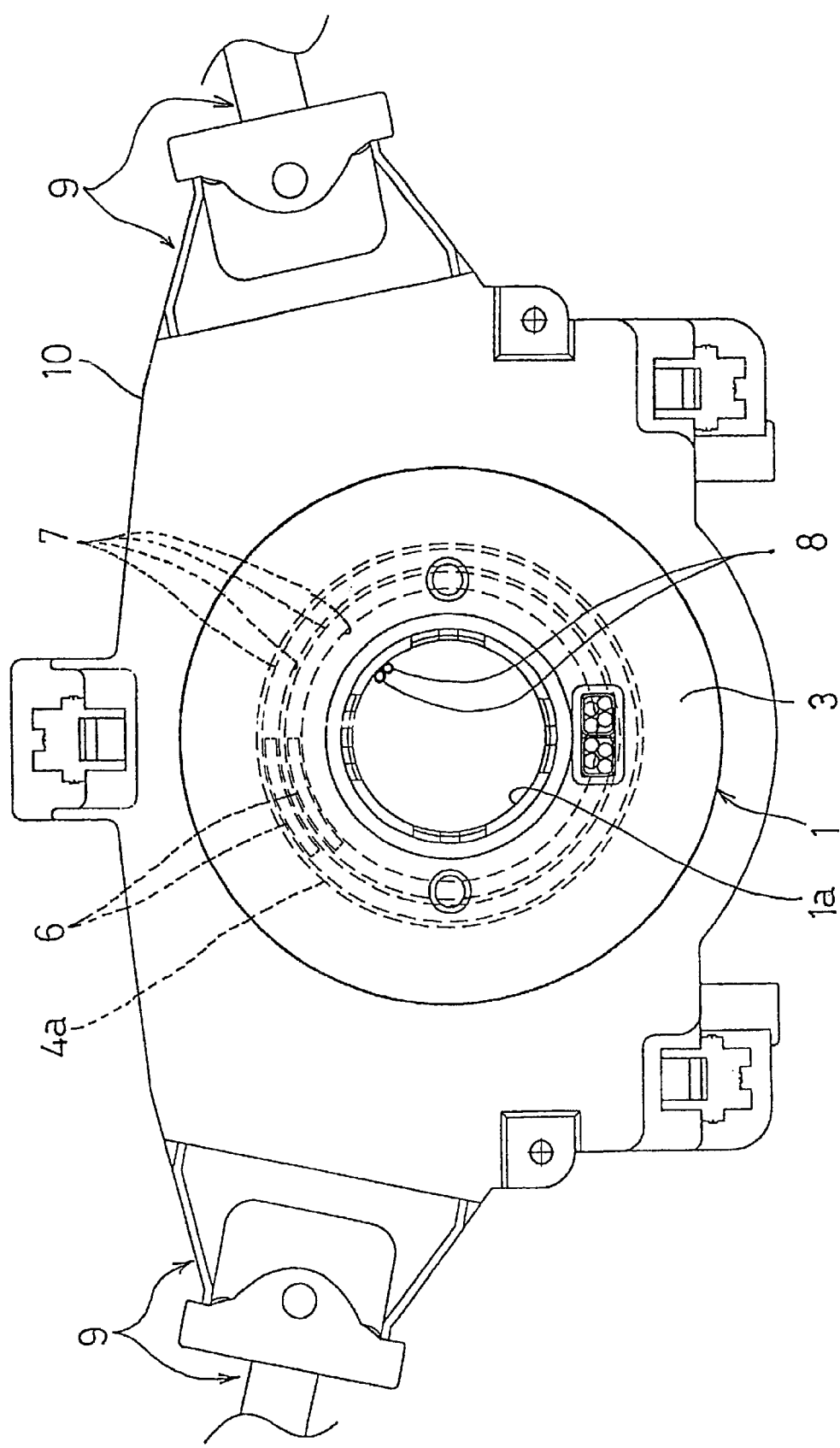
FIG. 1 is a top view of a rotary connector according to a preferred embodiment of the present invention, showing the rotary connector when it is mounted to a combination switch.

A rotary connector 1 according to a preferred embodiment of the present invention will now be described in detail with reference to FIGS. 1 and 2 of the drawings.

The rotary connector 1 electrically connects the vehicle body of an automobile to a steering wheel 11 of the automobile. The rotary connector 1 includes a stator housing 2, a rotor housing 3, an attachment 4, and a flat cable 5. The stator housing 2 is mounted to a combination switch 9 that is fixed to the steering column (not shown). The rotor housing 3 engages the underside of the steering wheel 11 and rotates together with the steering wheel 11. The attachment 4 rotatably engages the rotor housing 3. The flat cable 5 is in the shape of a spiral accommodated in a space defined between the stator housing 2 and the rotor housing 3.

The stator housing 2 is a stationary part that is fixed on a base 10 of the combination switch 9 by means of a screw or a fastening portion 2c. The stator housing 2 includes a bottom section 2a and a side section 2b that are assembled together. Specifically, the side section 2b has engagement holes (not shown), while the bottom section 2a has claws (not shown). The bottom section 2a and side section 2b are assembled together with the claws fitted into the engagement holes.

Alternatively, the bottom section 2a and side section 2b may be formed in a one piece construction, thereby providing the stator housing 2 in a single piece.

The upper surface of the bottom section 2a holds one end of the flat cable 5, as shown in in FIG. 2, and has a guide (not shown) in a space A defined by the stator housing 2 and the rotor housing 3. The guide guides the flat cable 5 accommodated in the space A. The space A has a slide sheet 13 placed on the inner bottom floor of the bottom section 2a. Disposed below the guide is a connector 2d provided on the side section 2b of the stator housing 2.

As shown in FIG. 1, the bottom section 2a has a plurality of ring-shaped non-movable contact-plates 7 that are exposed. The non-movable contact-plates 7 are, for example, insert-molded in the bottom surface of the stator housing 2. As shown in FIG. 2, first ends of the non-movable contact-plates 7 are exposed within the bottom section 2a and second ends are exposed as terminals 7a in the connector 2d.

The connector 2d has terminals (not shown) that are connected via the flat cable 5 to a wire harness 12 disposed on the rotor housing 3. The terminals (not shown) connected to the flat cable 5 and the terminals 7a of the non-movable contact-plate 7 may be disposed in the connector 2d or may be disposed in separate connectors (not shown).

The side section 2b has a substantially ring-shaped cylindrical portion 2e and a frame section 2f formed on an outer periphery around the lower end of the cylindrical portion 2e. The frame section 2f and the cylindrical portion 2e having a one-piece construction. The frame section 2f has the connector 2d and the fastening portion 2c for fixing the rotary connector 1 to the base 10 of the combination switch 9.

The attachment 4 has a fitting portion 4b and a projection 4c shown in FIG. 2 that couples the stator housing 2 to the rotor housing 3. The attachment 4 also has an annular flange 4a around the outer surface of the attachment 4, and a through-hole 4d formed below the flange 4a. A cord 8 passes through the through-hole 4d. In other words, the attachment 4 couples the stator housing 2 to a rotor housing 3 by using such a means as disclosed in Laid-Open Japanese Patent No. 10-22029.

The flange 4a supports a plurality of movable contact plates 6 that are formed of an electrically conductive, resilient material as shown in FIGS. 1 and 2. For example, two movable contact plates 6 are used, but more movable-contact plates may be used as required. The movable contact plate 6 is crimped to securely attach to the flange 4a, and a crimped portion projects downwardly of the flange 4a. The projecting portion of the movable contact plate 6 is soldered to a cord 8.

The cord 8 inserted through the through-hole 4d near the flange 4a passes through a shaft sleeve 1a, and is connected to a device, such as a steering wheel heater, mounted to the steering wheel 11. The cord 8 has a large diameter such that a relatively large current can flow through the cord 8.

The flat cable 5 has a plurality of, for example, belt-shaped wires that are arranged at predetermined intervals and sandwiched between two sheets of resin films made of insulation resin pressed together with heat applied thereto. The flat cable 5 has one end connected to the terminals in the connector 2d of the stator housing 2 and the other end connected to the wire harness 12 of the rotor housing 3.

The flat cable 5 is accommodated in a doughnut-shaped space defined by the stator housing 2 and rotor housing 3 such that the flat cable 5 is rotated clockwise and counter-clockwise through more than two complete rotations from a neutral position at which the vehicle runs straight.

The rotary connector according to the present invention has the construction described above. The rotary connector apparatus 1 and movable contact plate 6 are such that when the steering wheel 11 is rotated, the cord 8 rotates together with the steering wheel 11, attachment 4, and rotor housing 3. Thus, there is no chance of the cord being twisted. The movable contact plate 6 slides while also being in pressure contact with the non-movable contact plate 7 at all times. The cord 8, movable contact plate 6, and non-movable contact plate 7 are thicker than the conductors of the flat cable 5, so that a larger current can flow therethrough.

The present invention that is of the aforementioned construction and operates as described above provides the following advantages.

A rotary connector is provided having: a stator housing mounted on a vehicle body of an automobile; a rotor housing rotatably mounted to the stator housing and coupled to a steering wheel; an attachment that couples the rotor housing to the stator housing so that the rotor housing is rotatably relative to the stator housing; and a flat cable accommodated in a space defined by the rotor housing and the stator housing; wherein the attachment has an annular flange formed at an outer periphery thereof, and a slip-ring mechanism provided between the flange and a bottom of the stator housing. This construction allows electrical connection between the steering wheel and the vehicle body by means of the flat cable and slip-ring mechanism, so that more electric circuits can be accommodated on the steering wheel and steering pad. The current supplied to the slip-ring mechanism does not flow through the flat cable. Thus, a device that consumes a relatively large amount of current can be mounted on the steering wheel.

The rotary connector has the flat cable and the cord, and the cord has one end thereof connected to a device mounted on the steering wheel and the other end thereof connected to the slip-ring mechanism through a shaft sleeve. Thus, the cord can be routed out of the way of the rotating steering shaft so that the cord does not wrap around the steering shaft and steering wheel.

The rotary connector has the flange of the attachment supporting the movable contact plates of the slip-ring mechanism thereon; and the bottom of the stator housing has a non-movable contact plate thereon on which the movable contact plate slides. This structure allows the movable contact plate and the non-movable contact plate to be mounted without increasing the number of parts, thereby reducing cost.

The movable contact plate of the rotary connector is provided on the flange of the attachment and connected to the cord, and the non-movable contact plate is insert-molded in the bottom of the stator housing. Thus, the structure reduces the number of parts and assembly time, thereby contributing to cost reduction.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A rotary connector comprising:
   a stator housing (2) adapted to be mounted on a vehicle body of an automobile;
   a rotor housing (3) rotatably mounted to said stator housing (2) and adapted to be coupled to a steering wheel (11);
   an attachment (4) that couples said rotor housing (3) to said stator housing (2) so that the rotor housing (3) is rotatable relative to the stator housing (2); and
   a flat cable (5) accommodated in a space (A) defined by said rotor housing (3) and said stator housing (2);
   wherein said attachment (4) has an annular flange (4a) formed at an outer periphery thereof, and a slip-ring mechanism is provided between the flange (4a) and a bottom surface section (2a) of the stator housing (2).

2. The rotary connector according to claim 1, wherein the rotary connector (1) has a cord (8) with one end thereof adapted to be connected to a device mounted on the steering wheel (11) and another end thereof connected to the slip-ring mechanism through a shaft sleeve (1a).

3. The rotary connector according to claim 2, wherein the flange (4a) of the attachment (4) supports a movable contact plate (6) of the slip-ring mechanism thereon; and wherein the bottom surface section (2a) of the stator housing (2) has a non-movable contact plate (7) thereon on which the movable contact plate (6) slides.

4. The rotary connector according to claim 3, wherein the movable contact plate (6) is connected to the cord (8), and the non-movable contact plate (7) is insert-molded in the bottom surface section (2a) of the stator housing (2).

5. The rotary connector according to claim 1, wherein the flange (4a) of the attachment (4) supports a movable contact plate (6) of the slip-ring mechanism thereon; and wherein the bottom surface section (2a) of the stator housing (2) has a non-movable contact plate (7) thereon on which the movable contact plate (6) slides.

6. The rotary connector according to claim 5, wherein the movable contact plate (6) is connected to a cord (8), and the non-movable contact plate (7) is insert-molded in the bottom surface section (2a) of the stator housing (2).

7. The rotary connector according to claim 1, wherein said slip-ring mechanism has a plurality of movable contact plates supported by the flange and a non-movable contact plate on the stator housing, said movable contact plates being in sliding contact with said non-movable contact plate to provide current flow therebetween.

8. A rotary connector comprising:

a stator housing;

a rotor housing rotatably mounted to said stator housing;

an attachment that couples said rotor housing to said stator housing so that the rotor housing is rotatable relative to the stator housing, said attachment having an annular flange formed at an outer periphery thereof;

a flat cable accommodated in a space defined by said rotor housing and said stator housing, said flat cable having a first end connected electrically to a terminal of the stator housing and a second end connected electrically to a wire harness of the rotor housing; and a slip-ring mechanism provided between the flange and a bottom surface section of the stator housing, the slip-ring mechanism having at least one movable contact plate supported by the flange and a non-movable contact plate on the stator housing, said contact plates being in sliding contact with each other to provide current flow therebetween.

9. The rotary connector according to claim 8, further comprising a cord having one end thereof connected electrically to the movable contact plate of the slip-ring mechanism.

10. The rotary connector according to claim 8, wherein the slip-ring mechanism has a plurality of movable contact plates supported by the flange of the attachment, and wherein said non-movable contact plate is provided in a bottom of the stator housing.

11. The rotary connector according to claim 10, wherein said movable contact plates are formed of an electrically conductive, resilient material.

12. The rotary connector according to claim 10, wherein the non-movable contact plate is insert-molded in the bottom surface section of the stator housing.

* * * * *